United States Statutory Invention Registration [19]

[11] Reg. Number: H61

Yuhash, deceased et al. [45] Published: May 6, 1986

[54] SELF SUPPORTING CARTRIDGE AND WEAPON SYSTEM THEREFOR

[75] Inventors: Ladd Yuhash, deceased, late of Bud Lake, N.J.; by Salvatore Spignese, administrator, Lexington, Mass.

[73] Assignee: The United States of America as represented by the Secretary of the Army, Washington, D.C.

[21] Appl. No.: 739,803

[22] Filed: May 31, 1985

[51] Int. Cl.[4] ..... F41C 7/00

[52] U.S. Cl. ..... 42/39.5; 102/430; 102/434

*Primary Examiner*—Harold J. Tudor

*Attorney, Agent, or Firm*—Anthony T. Lane; Harold H. Card, Jr.; Michael C. Sachs

[57] ABSTRACT

A self supporting ammunition cartridge which need not be inserted into a chamber for firing, but is simply lined up with the aft end of the weapon's barrel and fired. The cartridge case is a hollow cylinder of composite non-metallic construction with a primer at its aft end and a projectile recessed into its forward end, with propellant filling the remainder of the hollow cylinder. The cartridge case is sufficiently strong to withstand the pressure of firing without being inserted into a firing chamber. The weapon for firing this cartridge comprises a gap equal in length to the cartridge where the chamber would be located.

8 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF SUPPORTING CARTRIDGE AND WEAPON SYSTEM THEREFOR

The invention described herein may be manufactured, used and licensed by or for the Government for governmental purposes without the payment to me of any royalties thereon.

BACKGROUND OF THE INVENTION

This invention relates to a new concept in small and medium caliber ammunition, and to novel weapon systems, such as rifles, automatic cannons, and machine guns, which are adapted to utilize ammunition embodying the novel concept. Conventional weapons of these types include a chamber at the aft end of the barrel. Conventional cartridges for such conventional weapons usually comprise metal cartridge cases with the primer at the aft end thereof and the projectile at the forward end, with the propellant filling the remainder of the cartridge case. A reciprocating bolt is used to ram these conventional cartridges into the chamber before firing, the bolt is then locked, the round fired, the bolt unlocked and the spent cartridge case extracted and discarded. The cycle repeats for each round fired. Such conventional cartridges and weapons systems are mechanically complex, require reciprocating parts and are heavy because of the many metallic components thereof.

The new concept cartridge and weapon system comprises a self supporting non metallic cartridge case which need not be inserted into a chamber for firing but is simply lined up with the weapon's barrel and fired. Thus the invention integrates the prior art cartridge case and chamber into one lightweight part.

SUMMARY OF THE INVENTION

This novel cartridge is adapted for use with novel weapons which have no chamber but have a gap where the chamber normally would be. A feed mechanism is adapted to position one of the aforementioned self supporting cartridges in the gap prior to firing, with the aft end of the cartridge butting against the firing mechanism and the forward end lined up with the open aft end of the weapon's barrel. Clusters of the novel cartridges can be linked together for use in automatic weapons of these types.

It is thus an object of this invention to provide a lightweight cartridge for small and medium caliber weapons which comprises a hollow cylinder comprising would fiberglass and resin, which cylinder has a primer at its aft end and a recessed projectile at its forward end with propellant between the primer and projectile, whereby said cartridge need not be inserted into a chamber to be fired.

Another object of the invention is to provide a novel weapon without a chamber which is adapted to fire the aforementioned cartridges.

A still further object of the invention is to provide a new weapon system including a novel cartridge which utilizes a non metallic cartridge case of composite wound construction, which cartridge case is capable of containing a primer, a projectile and a propellant and is also capable of withstanding the pressures of firing without being mounted in a conventional chamber.

Another object of the invention is to provide a weapon and cartridge thereof which does not require a conventional chamber, a bolt, nor an extractor, and wherein the cartridge case functions as a chamber, and wherein clusters of said cartridges can be adapted for automatic firing with the use of a simple feeding mechanism.

These and other objects and advantages of the invention will become apparent from the following detailed description and the drawings.

DETAILED DESCRIPTION OF A PREFERRED EMBODIMENT

The self supporting cartridge of the present invention is applicable to all small arms as well as medium caliber (20 mm–40 mm) ammunition and weapons. The novel cartridge has been designed within the materials state-of-the-art, with special attention given to minimizing possible stress discontinuities. The cartridge comprises a hollow cylinder of fiberglass filaments which are spool wound and bonded together with resin for maximum hoop strength. A conventional primer is mounted in the aft end of the hollow cylinder and the projectile is recessed flush into the forward end thereof. The projectile is held in position by a sleeve type seal which also prevents propellant gas leakage during firing.

The plastic and resin cartridge case has been designed to withstand an internal pressure of 200,000 pounds per square inch (psi). Maximum chamber pressure during the firing of conventional weapons of these calibers is 58,000 psi, thus the present cartridge case has a safety factor of more than 3 to 1. The unidirectionally wound fiberglass and resin structure maximizes the hoop strength of the hollow cylinder and the resultant composite material has a density considerably less than brass which is normally used for cartridge cases. Also, conventional brass or even steel cartridge cases require the support of a massive metallic chamber to prevent cartridge case rupture during firing.

Figure 1:
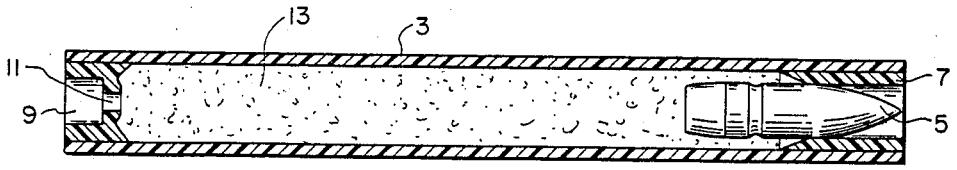
FIG. 1 is a side view in cross section of a self supporting cartridge of the present invention.

FIG. 1 is an illustrative embodiment of a self supporting cartridge of the present invention designed to accommodate a 5.56 mm projectile. The wound fiberglass and resin hollow tube 3 is approximately 85% fiberglass and 15% resin, by weight. The aft end of the tube 3 is fitted with a conventional primer 9 which communicates with the propellant charge 13 by means of flashhole 11. The 5.56 mm projectile 5 is recessed flush into the forward end of tube 3 and is sealed and held in place by annular seal 7, which has an inner diameter equal to the projectile's diameter and an outer diameter which permits it to snuggly fit into the end of cylinder 3. The seal 7 may be fabricated of Lexan or any other suitable material. The axial length of the tube 3 is 2.625 inches and the outer diameter thereof is 0.375 inches, with a wall thickness of approximately 0.0435 inches. This results in a weight of 76 grams for hollow tube cartridge case 3. The 5.56 mm projectile 5 weighs 56 grams, the primer 9, 4 grams, and the propellant 13, 25.5 grams, for a total cartridge weight of 161.5 grams. This is somewhat less than the 179.5 grams total weight of a cartridge with a brass cartridge case.

The cartridge of FIG. 1 has the same amount of propellant as a brass type cartridge and would still yield the same performance as far as muzzle velocity and muzzle energy are concerned.

Figure 2:
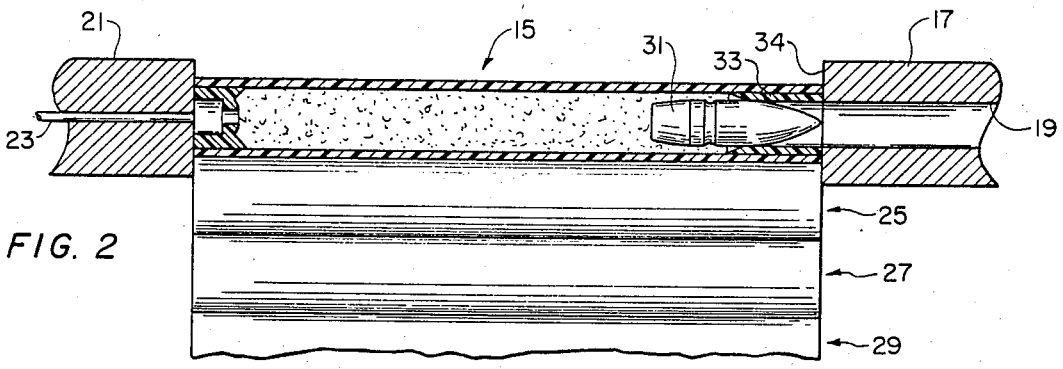
FIGS. 2–4 show a cluster of the novel cartridges being fired from a weapon designed to accommodate them.
Figure 3:
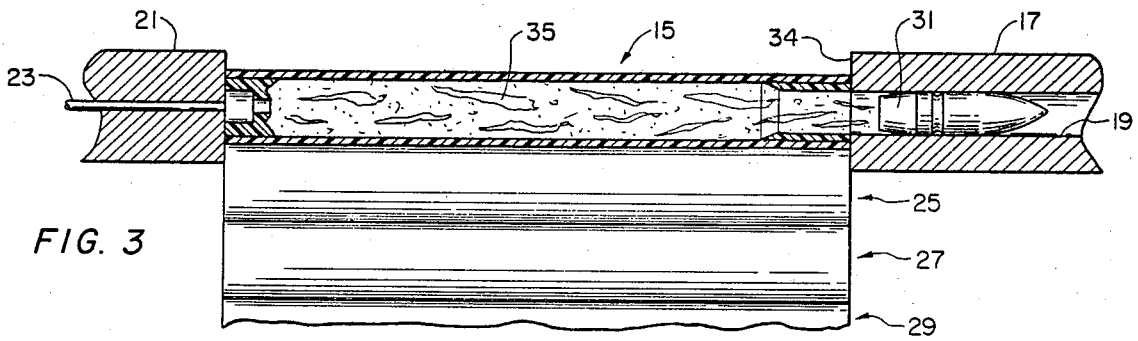

FIG. 2 shows a cartridge 15 like that of FIG. 1 which has been inserted into a weapon designed to fire it. The weapon includes a gap between the aft end of the barrel 17 and the firing mechanism 21, which gap is just long enough to accommodate the self supporting cartridge 15, which has been inserted into the gap so that the recessed projectile 31 of the cartridge is lined up with the bore 19 of barrel 17. The aft end of the cartridge fits snuggly against the firing mechanism which comprises a stationary portion 21 with a moveable firing pin 23 which is connected to the weapon's trigger, not shown. FIG. 3 shows the same weapon and cartridge just after firing, with the projectile 31 traveling down the barrel, propelled by the expanding propellant gases 35. The reaction to the expanding gases and to the forward momentum of the projectile pushes the hollow cartridge case to the rear against firing mechanism 21, so that gas leakage around the aft end thereof is minimized. Simultaneously, the forward motion of the projectile and the expanding gas 35 drags the annular sleeve 33 slightly forward so that it butts up against the rear surface 34 of the barrel 17, to prevent leakage of the propellant gases at this point. As stated above, the composite wound structure of the cartridge case is strong enough to withstand the high pressures of firing without the support of a conventional chamber. The invention thus provides a lighter weight cartridge and a simpler firing mechanism since no reciprocating bolt mechanism is required to insert the cartridge and extract the spent case.

Figure 4:
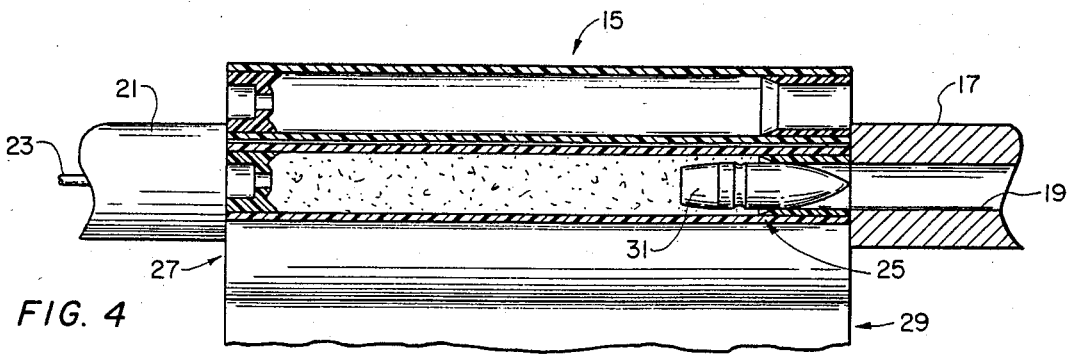

The cartridge 15 may be one of a cluster of similar cartridges which form a magazine or clip and which can be fed to the weapon in sequence to facilitate high speed automatic operation. In FIGS. 2–4 the numerals 25, 27, and 29 represent other similar cartridges forming a cluster. FIG. 4 shows the next cartridge 25 of the cluster inserted in the weapon, ready to fire, with the spent cartridge 15 having been moved upward. The cartridges 15, 25, 27 and 29 are all joined together in a single row by means of bonding material to form a one piece cluster or clip which can be easily inserted into the weapon.

Figure 5:
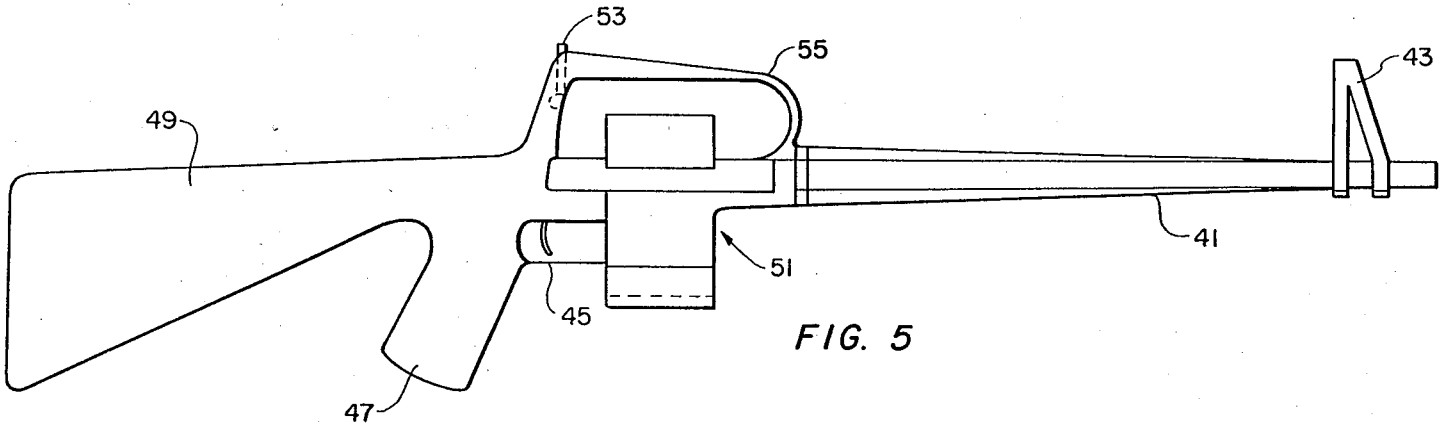
FIG. 5 is a side view of a weapon designed to fire the cartridge of the present invention.

FIG. 5 is an illustrative embodiment of a novel rifle designed to fire the novel self supporting cartridges of the present invention. The rifle comprises barrel 41, elevated forward sight 43, ammunition feed mechanism 51, elevated rear sight 53 mounted on bracket 55, handle 47, trigger 45 and stock 49.

Figure 10:
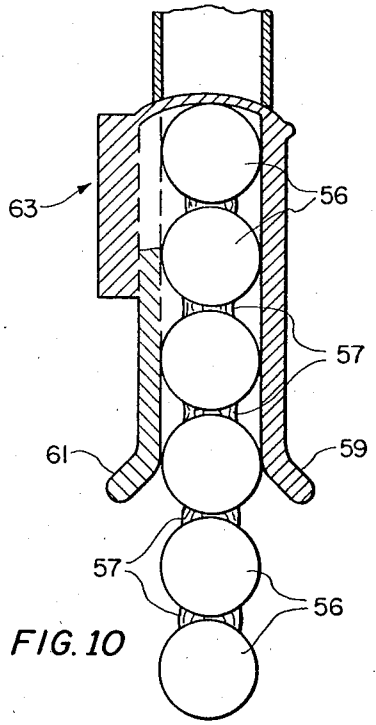
FIG. 10 shows a cluster of cartridges inserted into a feeding mechanism of a weapon such as that of FIG. 5.
Figure 7:
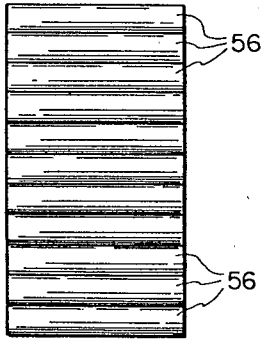
Figure 6:
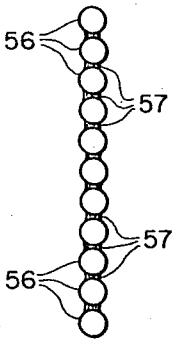

The ammunition clusters or clips may be arranged in different configurations. The simplest is the single barrel, single pass fed concept illustrated in FIGS. 6 and 7 which are, respectively, end and side views of a cluster or eleven self supporting cartridges 56, like those of FIG. 1, arranged in a single row, the separately wound cartridge cases are all bonded together, for example by means of bonding material 57 to form a rigid cluster. FIG. 10 shows such a single row cluster inserted into a feed mechanism such as 51 of FIG. 5. This feed mechanism comprises a slot formed by sidewalls 59 and 61 and includes an indexing mechanism 63 which may comprise, for example, a gas powered longitudinal slide cam and ratchet pawl for indexing the cluster after the firing of each round. Such a cluster can be placed into the weapon similar to the way a box magazine is placed into a conventional weapon, yet the illustrated cluster utilizes less storage volume and is lighter than the same number of conventional magazine rounds. Such a cluster is also completely sealed and is rust and corrosion resistant. The entire ammunition cluster is ejected from the weapon in one piece after firing, which requires only a simple feed system which is free of magazine spring, and follower hangups, which are sometimes possible in prior art weapons systems.

Figure 9:
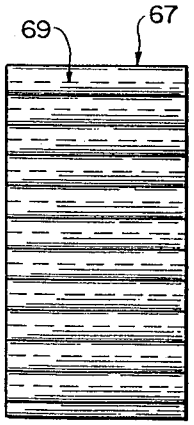
FIGS. 6–9 are front and side views of two different types of clusters of the novel self supporting cartridges.
Figure 8:
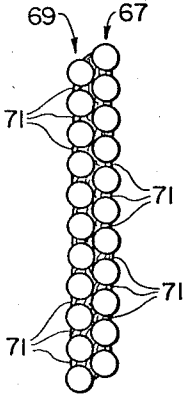

Another cluster configuration is the single barrel, twin pass concept illustrated by the end and side views of FIGS. 8 and 9. This cluster comprises two rows of staggered self supporting cartridges, 67 and 69, with the cartridges of each row offset by half the diameter of a cartridge, to form a nested cluster, as shown. The cartridges are all held together by bonding material indicated by the reference numeral 71. The feeding mechanism of the weapon for such a cluster would be designed to fire one of the two rows first, after which the cluster is manually removed from the weapon; reversed and fed back through the feed mechanism to fire the second row. The spent cluster is then removed by hand or forced from the weapon by the following live cluster and discarded.

A dual row cluster like that of FIGS. 8 and 9 can also be used with a double-barreled weapon in which each of the two rows of cartridges are fired by a different one of the barrels. The trigger mechanism would be designed to provide for serial firing from each barrel in sequence. Thus the ammunition cluster need pass through the weapon only once to be completely consumed.

While the invention has been described in connection with illustrative embodiments, obvious variations therein will occur to those skilled in this art without the exercise of invention, accordingly the invention should be limited only by the scope of the appended claims.

What is claimed is:

1. A self supporting cartridge comprising a hollow cylinder which is wound from fiberglass filaments which are bonded together with resin, a conventional primer mounted in the aft end of said cylinder and a projectile mounted in the forward end thereof, said projectile recessed flush with the forward end of said cylinder, said hollow cylinder being designed to withstand the pressures of firing without being confined to a conventional chamber.

2. A weapon system comprising a self supporting cartridge, a barrel and a firing mechanism with a gap between the aft end of said barrel and the forward end of said firing mechanism, said gap being long enough to accommodate said self supporting cartridge, said cartridge comprising a non-metallic composite hollow cylinder with an axial length equal to the length of said gap, and having a primer at its aft end and a projectile recessed flush into its forward end, and means to insert said cartridge into said gap prior to the firing thereof.

3. A self supporting ammunition cartridge for small and medium caliber weapons, comprising a non-metallic cylindrical cartridge case of composition construction, said case having a conventional primer recessed into the aft end thereof and a projectile recessed flush into the forward end, said projectile being supported by an annular seal having an outside diameter equal to the inside diameter of said case and an inner diameter equal to the diameter of said projectile, the remainder of the space within said case being filled with a propellant.

4. The cartridge of claim 3 wherein said cartridge case is designed to withstand an internal pressure of 200,000 pounds per square inch, whereby said cartridge may be fired without being confined to a conventional chamber.

5. The cartridge of claim 4 wherein said cartridge case is formed by winding fiberglass filaments which are bonded together with resin and wherein said case is approximately 85% fiberglass and 15% resin.

6. A weapon system comprising a weapon with a barrel and a firing mechanism, with a gap between said barrel and firing mechanism where the chamber of a conventional weapon would be located, and a self supporting cartridge designed to be inserted into said gap and lined up with the aft end of said barrel, said cartridge comprising a hollow cylinder of composite nonmetallic construction, said hollow cylinder having a recessed primer in the aft end thereof and a recessed projectile in the forward end thereof, with propellant between said primer and said projectile.

7. The system of claim 6 wherein said cartridge further comprises an annular seal in which said projectile is mounted, said seal being designed to prevent leakage of propellant gas at the aft end of said barrel upon the firing of said weapon system.

8. The weapon system of claim 6 wherein said cartridge case is designed and constructed to withstand the pressure of firing without being confined to a conventional chamber.

* * * * *